(12) United States Patent  (10) Patent No.: US 7,371,046 B2
Lee et al.  (45) Date of Patent: May 13, 2008

(54) TURBINE AIRFOIL WITH VARIABLE AND COMPOUND FILLET

(75) Inventors: Ching-Pang Lee, Cincinnati, OH (US); Joseph Michael Guentert, Cincinnati, OH (US); James Robert Bailey, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 535 days.

(21) Appl. No.: 11/160,010

(22) Filed: Jun. 6, 2005

(65) Prior Publication Data

US 2006/0275112 A1   Dec. 7, 2006

(51) Int. Cl.
 *F04D 29/54*   (2006.01)
(52) U.S. Cl. .................. 415/191; 416/193 A; 416/234
(58) Field of Classification Search ................ 415/191, 415/208.1, 210.1, 914; 416/193 A, 228, 416/234, 236 R
See application file for complete search history.

(56) References Cited

U.S. PATENT DOCUMENTS

| 6,283,713 | B1 | 9/2001 | Harvey et al. |
| 6,419,446 | B1 | 7/2002 | Kvasnak et al. |
| 6,511,294 | B1 | 1/2003 | Mielke et al. |
| 6,969,232 | B2 * | 11/2005 | Zess et al. .................. 415/191 |
| 2004/0062636 | A1 * | 4/2004 | Mazzola et al. ............ 415/115 |
| 2004/0081548 | A1 | 4/2004 | Zess et al. |

FOREIGN PATENT DOCUMENTS

| DE | 19941134 C1 | 12/2000 |
| EP | 1507064 A | 2/2005 |
| JP | 61149504 A | 8/1986 |

* cited by examiner

*Primary Examiner*—Edward K. Look
*Assistant Examiner*—Dwayne J White
(74) *Attorney, Agent, or Firm*—Adams Intellectual Property Law, P.A.; William Scott Andes, Esq.

(57) ABSTRACT

A turbine airfoil may be a rotating blade having a single platform, or a stationary nozzle having a pair of platforms. The airfoil body has pressure and suction sidewalls extending between leading and trailing edges. A compound fillet is disposed between the airfoil body and at least one of the platforms. The compound fillet includes a concave first fillet having a first radius, and a concave second fillet having a second, greater radius. The second fillet extends from the leading edge downstream along the suction sidewall and terminates at a point upstream of the trailing edge. The second fillet may also extend downstream from the leading edge along the pressure sidewall.

17 Claims, 9 Drawing Sheets

TURBINE AIRFOIL WITH VARIABLE AND COMPOUND FILLET

BACKGROUND OF THE INVENTION

This invention relates generally to gas turbine components, and more particularly to turbine airfoils.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan. Each turbine stage commonly includes a stationary turbine nozzle followed by a turbine rotor.

The turbine nozzle comprises a row of circumferentially side-by-side nozzle segments each including one or more stationary airfoil-shaped vanes mounted between inner and outer band segments defining platforms for channeling the hot gas stream into the turbine rotor. Each of the vanes includes pressure and suction sidewalls that are connected at a leading edge and a trailing edge. The airfoil section typically has a broad, blunt leading edge having a region of high curvature referred to as a "high C" point transitioning from the leading edge to a convex shaped suction surface.

The thermal stress at the suction side high C point can be too high under the operating conditions. The gas flowfield in the platform region is very complex and highly three dimensional. When gas flow approaches the turbine blade leading edge, at the junction of leading edge and platform, there is a total pressure gradient in the radial direction within the boundary layer that results in the formation of a pair of counter-rotating horseshoe vortices on pressure and suction sides near the platform. The pressure side horseshoe vortex travels along the pressure gradient on the platform between adjacent blades and forms a pressure side passage vortex. The suction side horseshoe vortex travels along the suction side surface and migrates upward toward the trailing edge to form a suction side passage vortex. Both pressure and suction side passage vortices interact near the suction side trailing edge at an upper span location and cause total pressure loss and reduce turbine efficiency. The horseshoe vortices and passage vortices also create more turbulence and increase the heating to the platform surface.

Accordingly, there is a need for a turbine nozzle having low stresses at the junctures between the airfoil body and the attached platforms.

BRIEF SUMMARY OF THE INVENTION

The above-mentioned need is met by the present invention, which according to one aspect provides an airfoil for a gas turbine engine, including an arcuate inner band having an inner platform; and an airfoil body extending outwardly from inner platform, the airfoil body having opposed pressure and suction sidewalls extending between a leading edge and a trailing edge thereof. The airfoil has an inner compound fillet, including a concave first inner fillet disposed between the airfoil and the inner platform, the first inner fillet having a first radius and extending around the periphery of the airfoil; and a concave second inner fillet disposed between the airfoil and the inner platform. The second inner fillet extends from the leading edge aftward along the suction sidewall and terminates at a point axially forward of the trailing edge. The second fillet has a second radius greater than the first radius.

According to another aspect of the invention, a turbine nozzle segment includes an arcuate outer band having an outer platform; an arcuate inner band having an inner platform; and an airfoil disposed between the inner and outer bands, the airfoil having opposed pressure and suction sidewalls extending between a leading edge and a trailing edge thereof. The airfoil has an outer compound fillet, including a concave first outer fillet disposed between the airfoil and the outer platform, the first outer fillet having a first radius; and a concave second outer fillet disposed between the airfoil and the outer platform, the second outer fillet extending from the leading edge downstream along the suction sidewall and terminating at a point upstream of the trailing edge. The second outer fillet has a second radius greater than the first radius.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
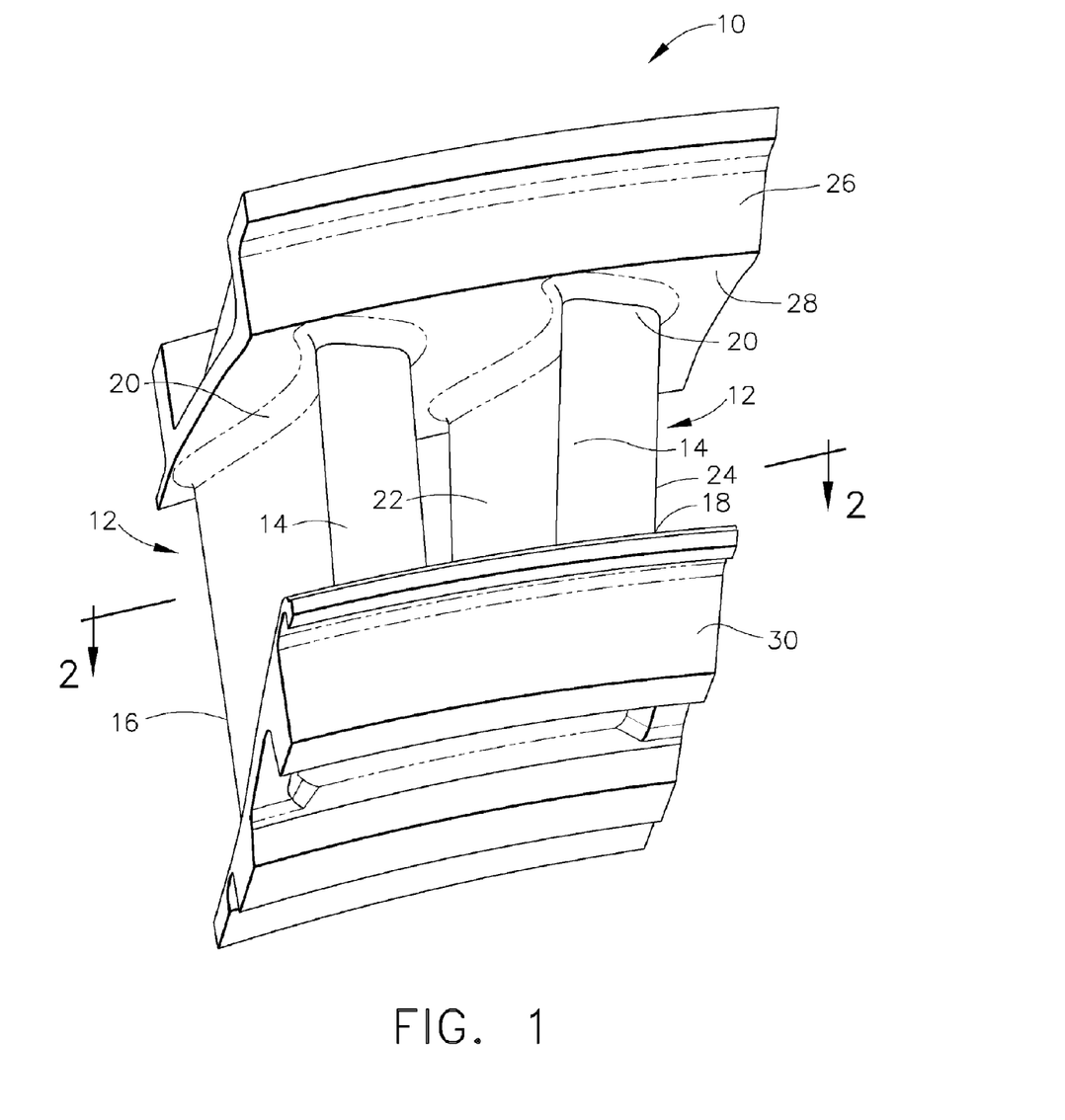
FIG. 1 is a perspective view of a turbine nozzle segment constructed according to the present invention.
Figure 2:
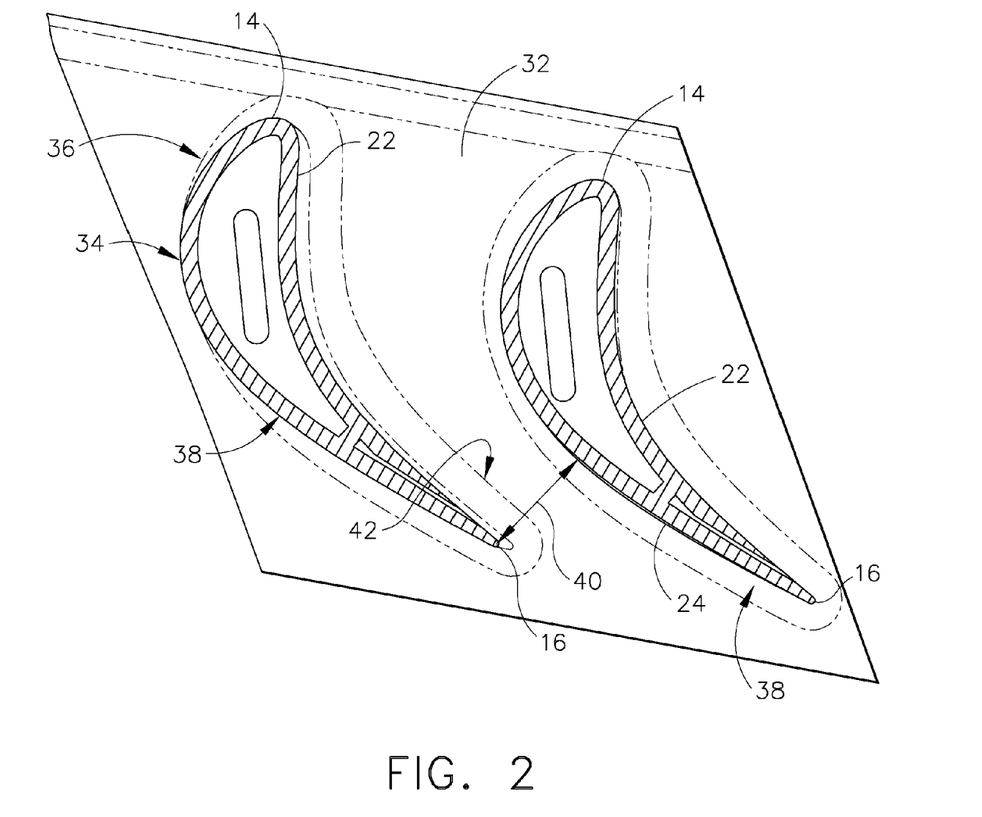
FIG. 2 is cross-sectional view taken along lines 2-2 of FIG. 1.
Figure 3:
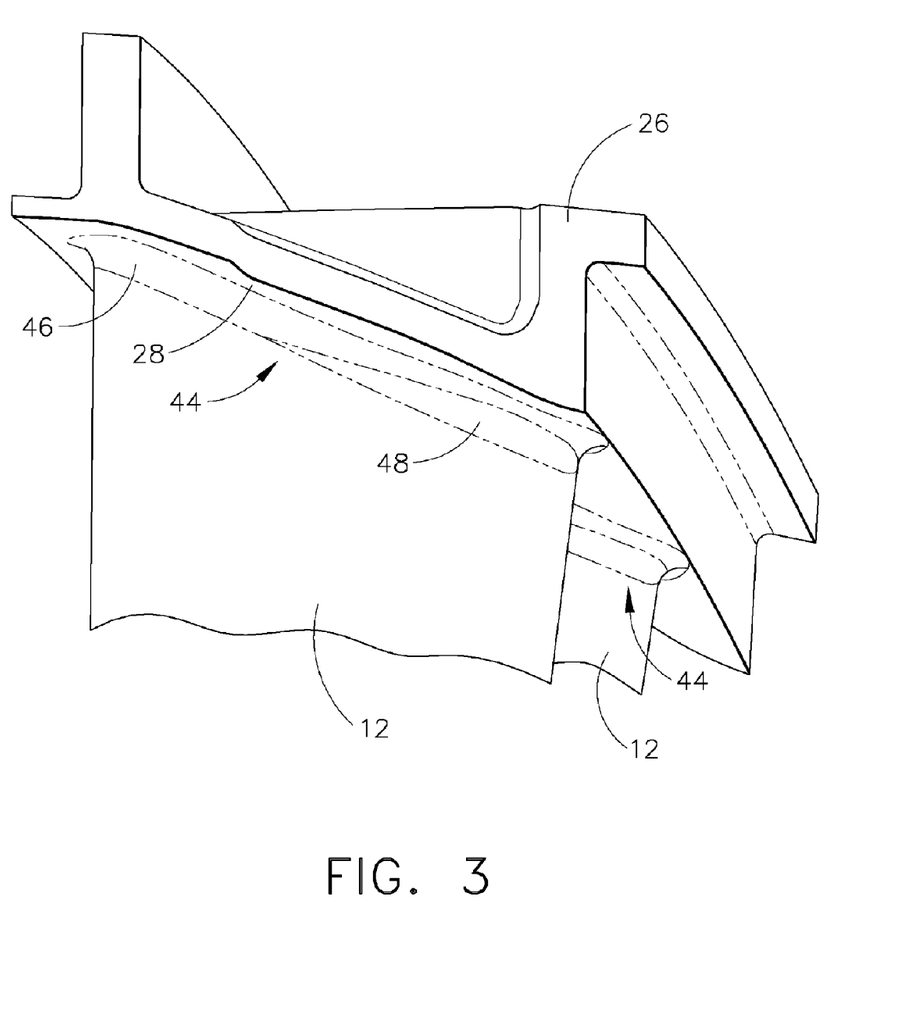
FIG. 3 is a perspective view of an outer pressure-side portion of the nozzle segment of FIG. 1.
Figure 4:
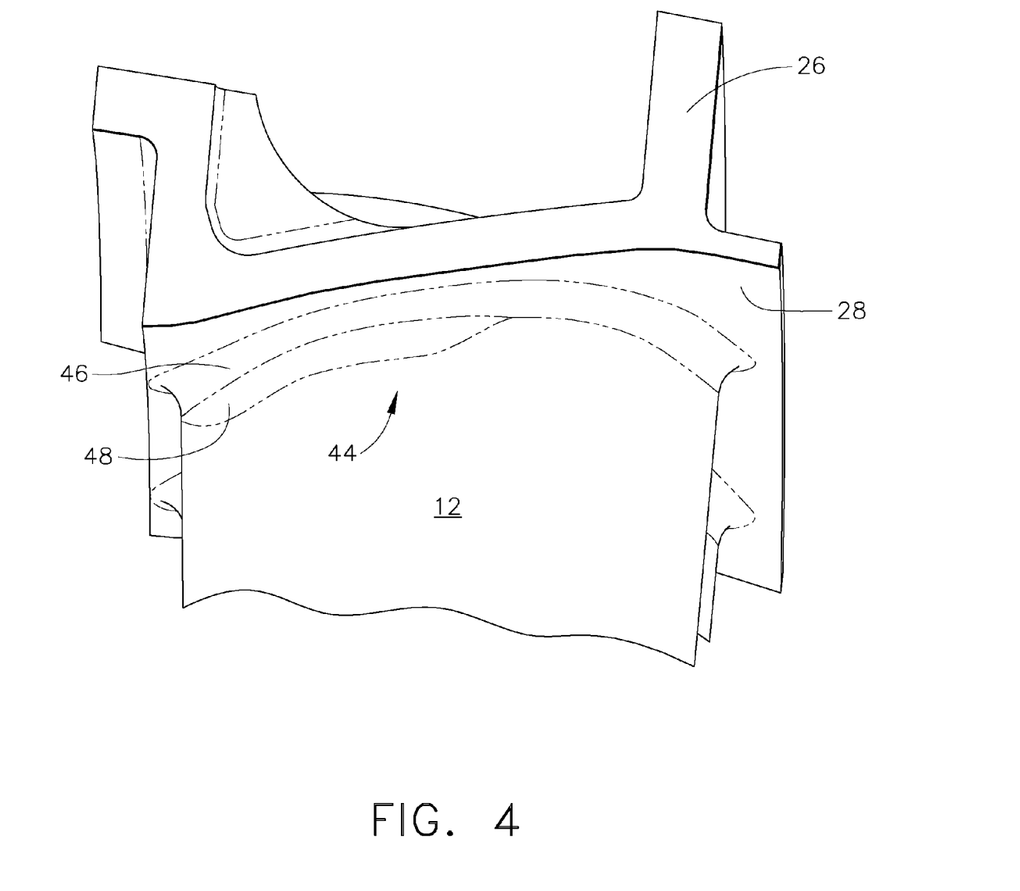
FIG. 4 is a perspective view of an outer suction-side portion of the nozzle segment of FIG. 1.

Referring to the drawings wherein identical reference numerals denote the same elements throughout the various views, FIGS. 1-3 illustrate an exemplary high pressure turbine (HPT) nozzle segment 10 constructed in accordance with the present invention. A plurality of such nozzle segments 10 are assembled in circumferential side-by-side fashion to build up an HPT nozzle. The nozzle segment 10 includes one or more hollow, airfoil-shaped, internally-cooled vanes 12 each having a leading edge 14, a trailing edge 16, a root 18, a tip 20, and spaced-apart pressure and suction sidewalls 22 and 24, respectively. An arcuate outer band 26 having an outer platform 28 is attached to the tips 20 of the vanes 12. An arcuate inner band 30 having an inner platform 32 is attached to the roots 18 of the vanes 12. The outer and inner bands 26 and 30 define the outer and inner radial boundaries, respectively, of the primary gas flowpath through the nozzle segment 10.

The nozzle segment 10 is typically formed from a high-temperature capable metallic alloy such as known nickel or cobalt-based "superalloys". It may be cast as a single unit, or it may be assembled from individual components or sub-assemblies. For example, one, two, three, and four-piece configurations are all known ways of assembling a "doublet" having two vanes 12 disposed between inner and outer bands 26 and 30.

FIG. 2 is a cross-sectional view taken along lines 2-2 of FIG. 1 illustrating the airfoil section of the vanes 12. The suction sidewall 24 of each vane 12 extends rearward from the leading edge 14, and has a high curvature or "high C" point defining a transition between relatively less curved forward and aft portions 36 and 38, respectively, of the suction sidewall 24.

A throat 40 defining the minimum cross-sectional flow area is defined between an aft portion 42 of the pressure sidewall of vane 12 and the aft portion 38 of the suction sidewall 24 of the adjacent vane 12. The area of the throat 40 is a key dimension affecting the aerodynamic performance of the nozzle segment 12. It is therefore desirable to maintaining the actual area of the throat 40 as close as possible to the intended design value.

As shown in FIG. 3, an outer compound fillet 44 is disposed between the outer platform 28 and the vane 12. Although the outer compound fillet 44 would typically be formed as a single unitary portion of a larger casting, for purposes of explanation it is described herein as including a first outer fillet 46 and a second outer fillet 48. The concave first outer fillet 46 spans the vane 12 and the outer flowpath surface at the tip 20 of the vane 12. It extends around the entire periphery of the vane 12. The first outer fillet 46 may have a simple circular cross-sectional profile. Typically the radius of the first outer fillet 46 will be about 3.175 mm (0.125 in.)

Referring to FIGS. 3-6, the second outer fillet 48 is disposed slightly radially inward of the first outer fillet 46 and overlaps the first outer fillet 46 in a radial direction. The second outer fillet 48 extends around the leading edge 14 and along the pressure sidewall 22 and then tapers down in width in an aft direction, merging with the first outer fillet 46 toward the downstream pressure sidewall mid-chord region. On the suction sidewall 24, the maximum fillet width and radius of the second outer fillet 48 (and thus of the outer compound fillet 44) is preferably located at the high C point 34, to lower the stresses at that point. Proceeding aftward, the fillet width is tapered down to merge into the first outer fillet 46 upstream of the throat location to maintain the intended throat flow area. The leading edge 14 at the vane tip 20 is therefore enlarged with an increased fillet radius, compared to a prior art vane without the outer compound fillet 44.

Figure 5:
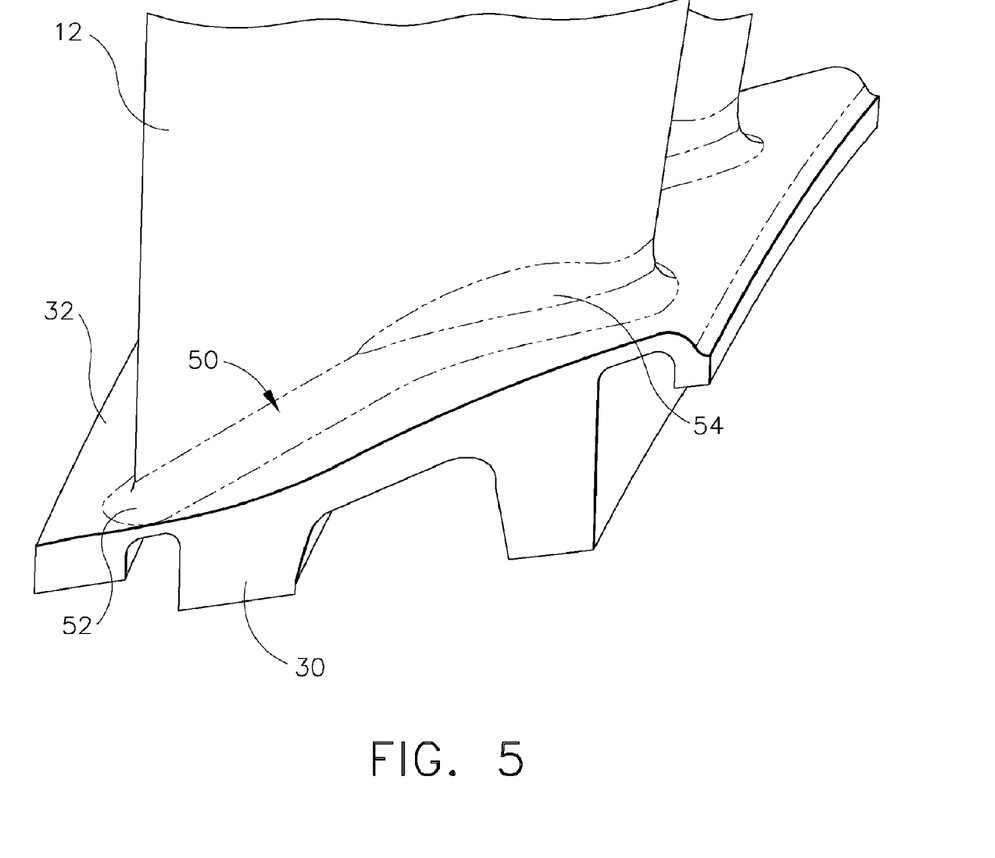
FIG. 5 is a perspective view of an inner pressure-side portion of the nozzle segment of FIG. 1.
Figure 6:
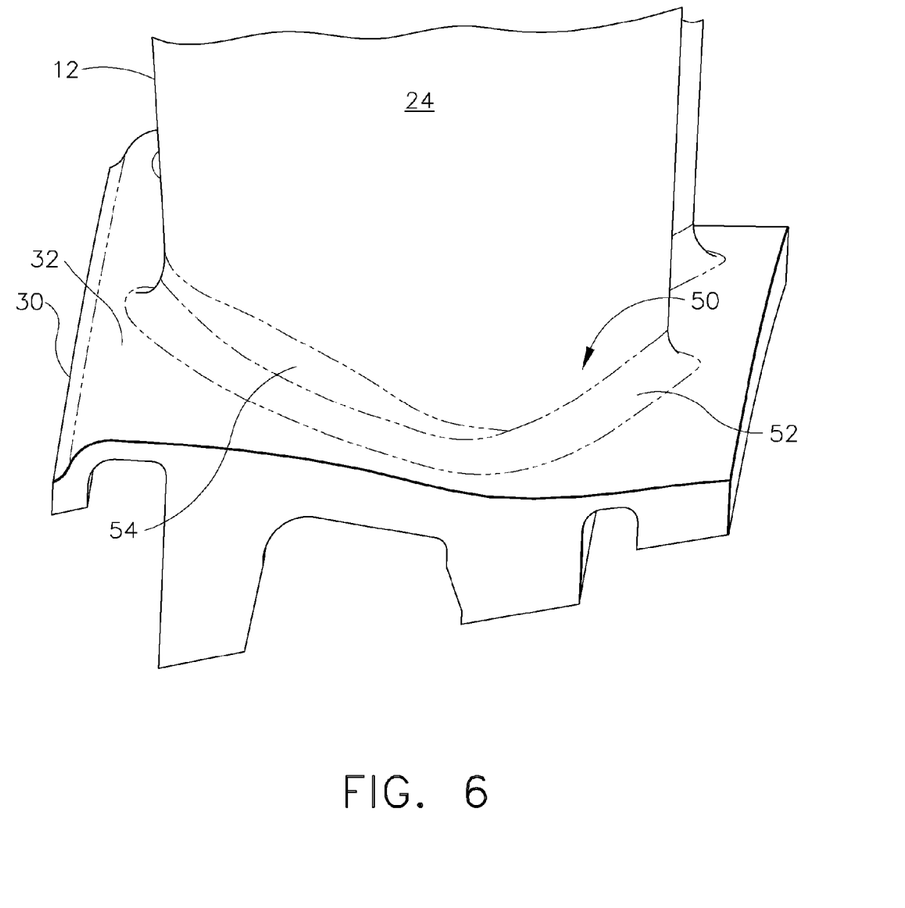
FIG. 6 is a perspective view of an inner suction-side portion of the nozzle segment of FIG. 1.

As illustrated in FIGS. 5 and 6, an optional inner compound fillet 50 comprising a first inner fillet 52 and a second inner fillet may be disposed between the inner platform 32 and the vane 12. Although the inner compound fillet 50 would typically be formed as a single unitary portion of a larger casting, for purposes of explanation it is described herein as including a first inner fillet 52 and a second inner fillet 54. The concave first inner fillet 52 spans the vane 12 and the inner flowpath surface at the root 18 of the vane 12. It extends around the entire periphery of the vane 12. The first inner fillet 52 may have a simple circular cross-sectional profile. Typically the radius of the first inner fillet 52 will be about 3.175 mm (0.125 in.)

The second inner fillet 54 is disposed slightly radially outward of the first inner fillet 52 and overlaps the first inner fillet 52 in a radial direction. On the suction sidewall 24, the maximum fillet width and radius of the second inner fillet 54 (and thus of the inner compound fillet 50) is preferably located at the high C point 34, to lower the stresses at that point. Proceeding aftward, the fillet width is tapered down to merge into the first inner fillet 52 upstream of the throat location. The leading edge 14 at the vane root 18 is therefore enlarged with an increased fillet radius, compared to a prior art vane without the inner compound fillet 50.

The second inner fillet 54 also extends around the leading edge 14 and passes along the pressure sidewall 22 and then tapers down in width in an aft direction, merging with the first inner fillet 52 toward the downstream pressure sidewall mid-chord region.

Figure 7:
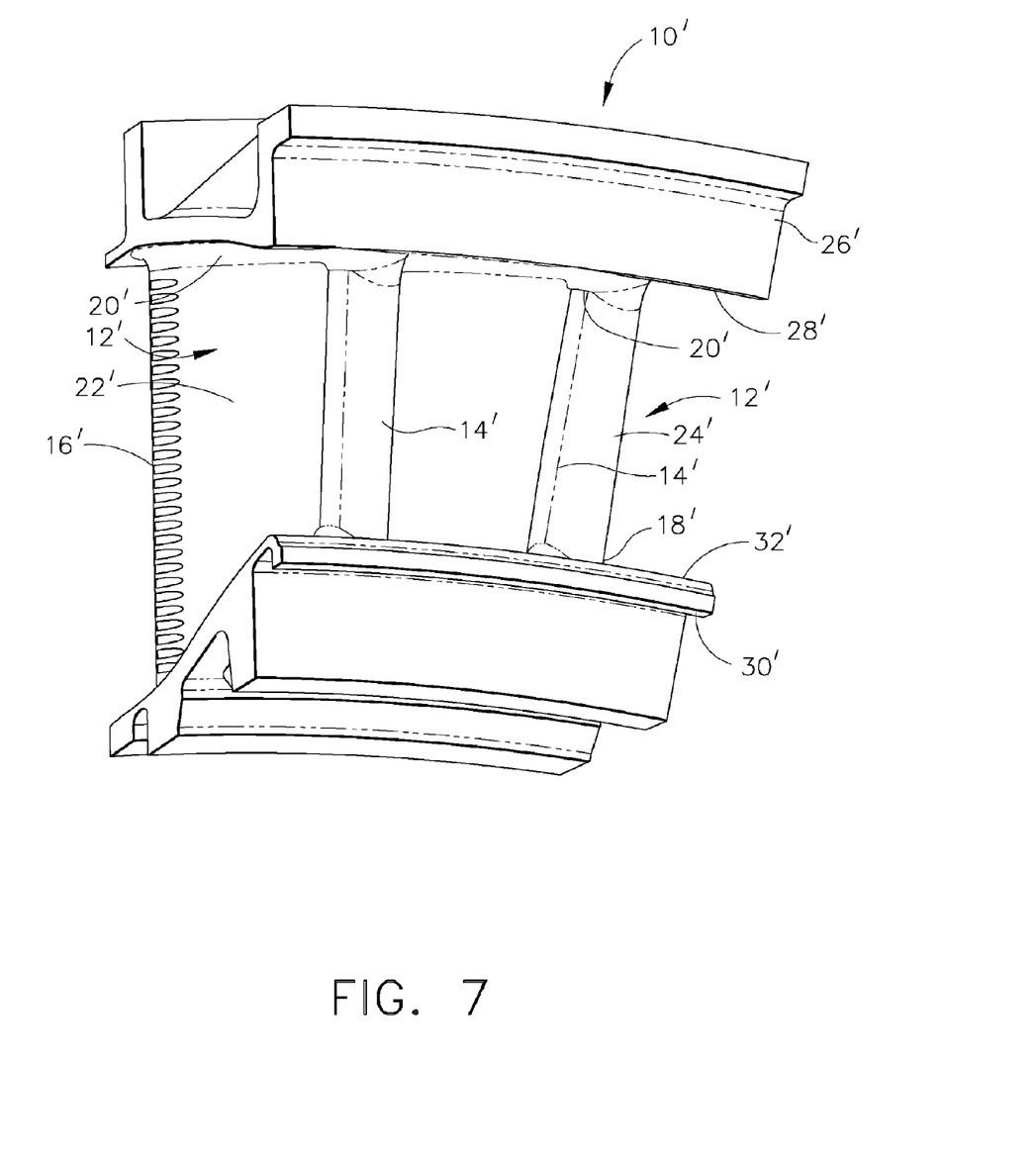
FIG. 7 is a perspective view of an alternative turbine nozzle segment constructed according to the present invention.
Figure 8:
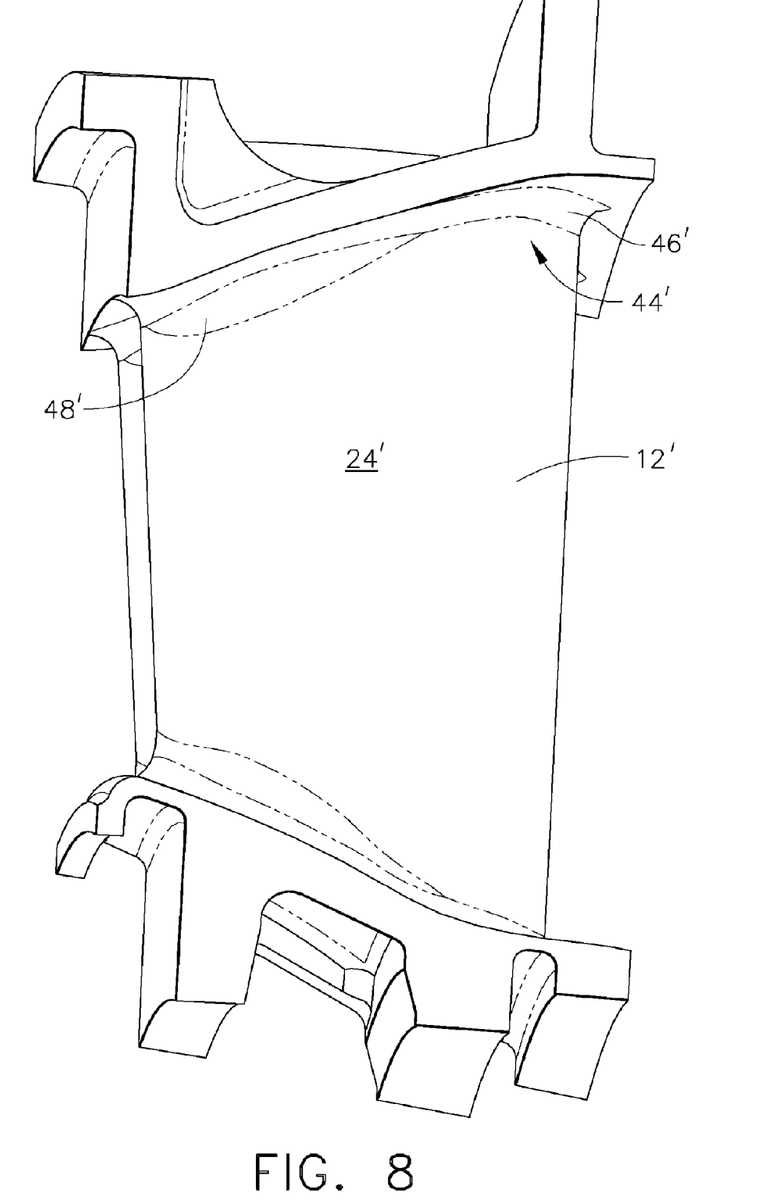
FIG. 8 is a perspective view of the suction side of the nozzle segment of FIG. 7.
Figure 9:
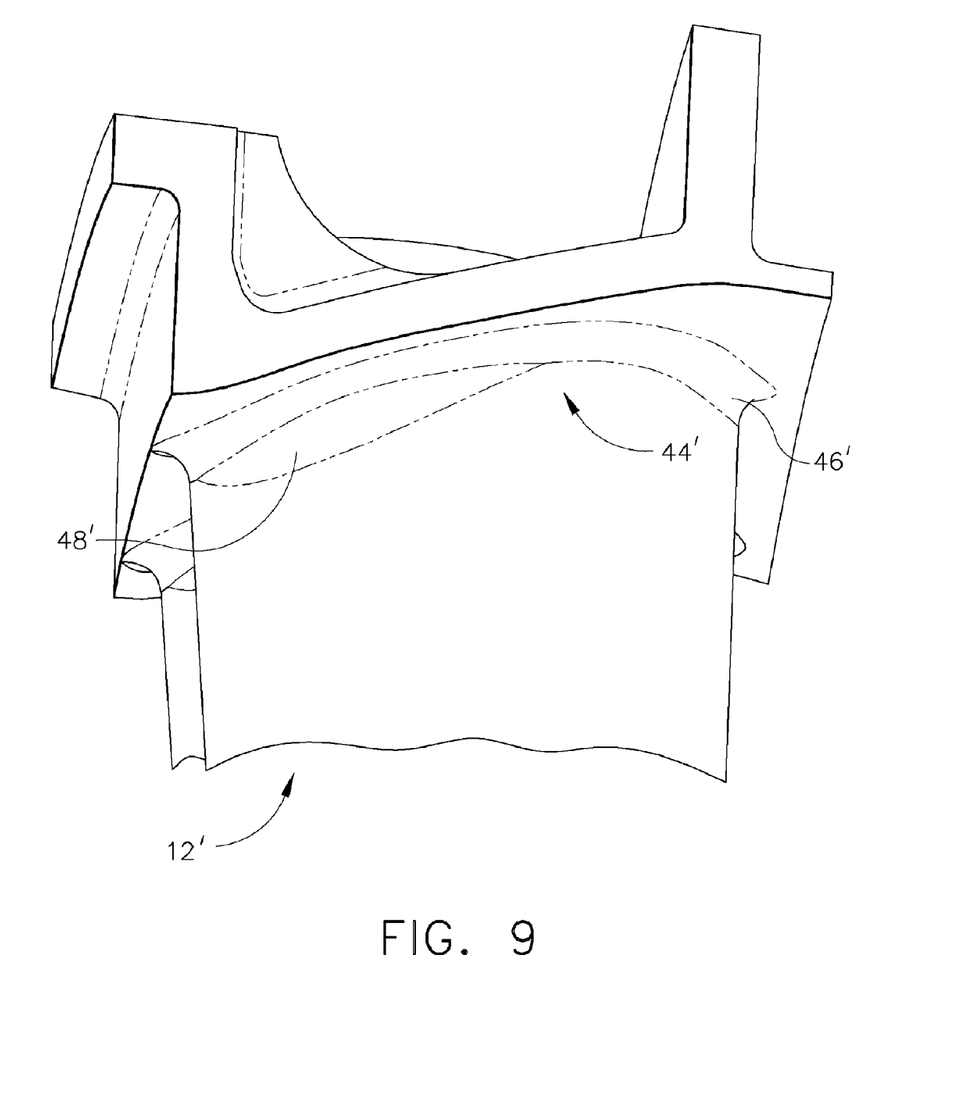
FIG. 9 is a perspective view of an outer suction-side portion of the nozzle segment of FIG. 7.

FIGS. 7, 8, and 9 illustrate an alternative nozzle segment 10' which is substantially similar to the nozzle segment 10 except for the outer compound fillet 44'. It includes one or more hollow, airfoil-shaped, internally-cooled vanes 12' each having a leading edge 14', a trailing edge 16', a root 18', a tip 20', and spaced-apart pressure and suction sidewalls 22' and 24', respectively. An arcuate outer band 26' having an outer platform 28' is attached to the tips 20' of the vanes 12' An arcuate inner band 30' having an inner platform 32' is attached to the roots 18' of the vanes 12'. The outer and inner platforms 28' and 32' define the outer and inner radial boundaries, respectively, of the primary gas flowpath through the nozzle segment 110'.

The outer compound fillet 44' includes a first outer fillet 46' and a second outer fillet 48' disposed between the outer platform 28' and the vane 12'. The outer compound fillet 44' has a shape and dimensions substantially similar to that of the outer compound fillet 44 described above, but it does not extend into the pressure sidewall 22'.

The nozzle segment 10 described above offers multiple manufacturing and operational advantages compared to prior art nozzles lacking the variable and compound fillets described above. The larger fillet radii increase the cross-sectional area at the junctions between the vanes 12 and the inner and outer platforms 32 and 28 and therefore lower stress. This also improves the castability by increasing the size of the smallest feature to be cast. The larger fillet at the vane leading edge 14 adjacent to the inner and outer platforms 32 and 28 will accelerate the boundary layer flow and reduce the horseshoe vortex strength, thus improving the efficiency of the nozzle segment 10. The larger leading edge nose also lowers the wetted hot surface area at the fillet area and creates lower leading edge surface heat transfer coefficient and smaller horseshoe vortices that will generate less turbulence and lower the platform surface heat transfer coefficient.

The foregoing has described a turbine airfoil for a gas turbine engine. While specific embodiments of the present invention have been described, it will be apparent to those skilled in the art that various modifications thereto can be made without departing from the spirit and scope of the invention. For example, the variable and compound fillet could also be implemented on a rotating turbine blade of a known type (not shown) having an airfoil similar to the vane 12 described above and a platform defining a portion of a hot gas flowpath, similar to the inner platform 32 described above. Accordingly, the foregoing description of the preferred embodiment of the invention and the best mode for practicing the invention are provided for the purpose of illustration only and not for the purpose of limitation, the invention being defined by the claims.

What is claimed is:

1. An airfoil for a gas turbine engine, comprising:
an arcuate inner band having an inner platform; and
an airfoil body extending outwardly from inner platform,
said airfoil body having opposed pressure and suction sidewalls extending between a leading edge and a trailing edge thereof, said airfoil having an inner compound fillet, comprising:

a concave first inner fillet disposed between said airfoil and said inner platform, said first inner fillet having a first radius and extending around the periphery of said airfoil; and a concave second inner fillet disposed between said airfoil and said inner platform, said second inner fillet extending from said leading edge aftward along said suction sidewall and terminating at a point axially forward of said trailing edge, said second fillet having a second radius greater than said first radius.

2. The airfoil of claim 1 wherein said suction sidewall includes a high C point defining a transition between relatively less curved forward and aft portions thereof; and a maximum width of said second inner fillet is disposed at said high C point.

3. The airfoil of claim 1 wherein said width of said second inner fillet smoothly tapers from said maximum width in an aftward direction to merge with said first inner fillet upstream of said trailing edge.

4. The airfoil of claim 1 in which said second inner fillet is disposed radially outward of said first inner fillet and overlaps said first inner fillet in a radial direction.

5. The airfoil of claim 1 wherein said second inner fillet further extends from said leading edge aftward along said pressure sidewall and terminates at a point axially forward of said trailing edge.

6. The turbine nozzle segment of claim 5 wherein a width of said second outer fillet along said pressure sidewall is at a maximum near said leading edge and tapers in an aft direction.

7. A turbine nozzle segment, comprising:

an arcuate outer band having an outer platform;

an arcuate inner band having an inner platform; and an airfoil disposed between said inner and outer bands, said airfoil having opposed pressure and suction sidewalls extending between a leading edge and a trailing edge thereof, said airfoil having an outer compound fillet, comprising:

a concave first outer fillet disposed between said airfoil and said outer platform, said first outer fillet having a first radius; and a concave second outer fillet disposed between said airfoil and said outer platform, said second outer fillet extending from said leading edge downstream along said suction sidewall and terminating at a point upstream of said trailing edge, said second outer fillet having a second radius greater than said first radius.

8. The turbine nozzle segment of claim 7 wherein said suction sidewall of said airfoil includes a high C point disposed aft of said leading edge, and said second outer fillet extends from said leading edge past said high C point.

9. The turbine nozzle segment of claim 8 wherein said second outer fillet has a maximum width at said high C point, said width tapering in an aft direction.

10. The turbine nozzle segment of claim 7 wherein said second outer fillet further extends from said leading edge downstream along said pressure sidewall and terminates at a point upstream of said trailing edge.

11. The airfoil of claim 7 in which said second outer fillet is disposed radially inward of said first outer fillet and overlaps said first outer fillet in a radial direction.

12. The turbine nozzle segment of claim 7 further including an inner compound fillet, comprising:

a concave first inner fillet disposed between said airfoil and said inner platform, said first fillet having a first radius; and a concave second inner fillet disposed between said airfoil and said inner platform, said second inner fillet extending from said leading edge downstream along said suction sidewall and terminating at a point upstream of said trailing edge, said second fillet having a second radius greater than said first radius.

13. The airfoil of claim 12 in which said second inner fillet is disposed radially outward of said first inner fillet and overlaps said first inner fillet in a radial direction.

14. The turbine nozzle segment of claim 12 wherein said suction sidewall of said airfoil includes a high C point disposed aft of said leading edge, and said second inner fillet extends from said leading edge past said high C point.

15. The turbine nozzle segment of claim 14 wherein said second inner fillet has a maximum width at said high C point, said width tapering in an aft direction.

16. The turbine nozzle segment of claim 7 wherein said second inner fillet further extends from said leading edge downstream along said pressure sidewall and terminates at a point upstream of said trailing edge.

17. The turbine nozzle segment of claim 16 wherein a width of said inner fillet along said pressure sidewall is at a maximum near said leading edge and tapers in an aft direction.

* * * * *